United States Patent
Sase et al.

(10) Patent No.: US 12,523,170 B2
(45) Date of Patent: Jan. 13, 2026

(54) INTERNAL COMBUSTION ENGINE MISFIRE DETECTING DEVICE AND MISFIRE DETECTING METHOD

(71) Applicant: MITSUBISHI HEAVY INDUSTRIES ENGINE & TURBOCHARGER, LTD., Kanagawa (JP)

(72) Inventors: Ryo Sase, Tokyo (JP); Ko Takayanagi, Tokyo (JP)

(73) Assignee: MITSUBISHI HEAVY INDUSTRIES ENGINE & TURBOCHARGER. LTD., Sagamihara (JP)

( * ) Notice: Subject to any disclaimer, the term of this patent is extended or adjusted under 35 U.S.C. 154(b) by 160 days.

(21) Appl. No.: 18/287,338

(22) PCT Filed: Jun. 2, 2022

(86) PCT No.: PCT/JP2022/022449
§ 371 (c)(1),
(2) Date: Oct. 18, 2023

(87) PCT Pub. No.: WO2022/255442
PCT Pub. Date: Dec. 8, 2022

(65) Prior Publication Data
US 2024/0376843 A1    Nov. 14, 2024

(30) Foreign Application Priority Data

Jun. 3, 2021   (JP) .................... 2021-093407

(51) Int. Cl.
*F02B 77/08* (2006.01)
*G01M 15/11* (2006.01)

(52) U.S. Cl.
CPC ........... *F02B 77/086* (2013.01); *G01M 15/11* (2013.01)

(58) Field of Classification Search
CPC .............................. F02B 77/086; G01M 15/11
(Continued)

(56) References Cited

U.S. PATENT DOCUMENTS 4,930,479 A * 6/1990 Osawa .................. G01M 15/11
  123/436
5,331,848 A * 7/1994 Nakagawa ............. G01M 15/11
  73/114.05
(Continued)

FOREIGN PATENT DOCUMENTS

JP      3-246353 A    11/1991
JP      5-71408 A     3/1993
(Continued)

OTHER PUBLICATIONS

International Preliminary Report on Patentability and Written Opinion of the International Searching Authority for International Application No. PCT/JP2022/022449, dated Dec. 14, 2023, with an English translation.

(Continued)

*Primary Examiner* — Logan M Kraft
*Assistant Examiner* — John D Bailey
(74) *Attorney, Agent, or Firm* — BIRCH, STEWART, KOLASCH & BIRCH, LLP

(57) ABSTRACT

A misfire detecting device for an internal combustion engine, having a plurality of cylinders is provided with: a pulsation component acquiring unit for performing a frequency analysis of operating parameter data indicating a change over time in an operating parameter correlated with an overall operating state of the plurality of cylinders, and for acquiring a pulsation component spectrum, which is a frequency spectrum of pulsations of the internal combustion engine; a difference parameter acquiring unit for acquiring a difference parameter correlated with a degree of difference (Continued)

between the operations of each of the plurality of cylinders; and all-cylinder misfire determining unit for determining that an all-cylinder misfire has occurred in the internal combustion engine if the pulsation component spectrum acquired by the pulsation component acquiring unit falls below a first threshold and the difference parameter acquired by the difference parameter acquiring unit 12 falls below a second threshold.

14 Claims, 12 Drawing Sheets

(58) Field of Classification Search
USPC .......................................................... 701/102
See application file for complete search history.

(56) References Cited

U.S. PATENT DOCUMENTS

| | | | | |
|---|---|---|---|---|
| 5,442,955 | A * | 8/1995 | Baba | G01M 15/11 340/439 |
| 5,485,374 | A * | 1/1996 | Takaku | F02D 41/22 701/111 |
| 5,493,901 | A * | 2/1996 | Kuroda | G01M 15/11 123/436 |
| 5,499,537 | A * | 3/1996 | Nakayama | G01M 15/11 701/111 |
| 5,506,778 | A * | 4/1996 | Matsumoto | F02D 41/1498 701/111 |
| 5,719,330 | A * | 2/1998 | Carr | G01M 15/11 73/114.62 |
| 5,804,711 | A * | 9/1998 | Remboski | G01M 15/11 73/114.05 |
| 5,862,506 | A * | 1/1999 | Lynch | G01P 3/46 701/111 |
| 5,869,752 | A * | 2/1999 | Klauber | G01L 3/105 73/DIG. 2 |
| 6,243,641 | B1 * | 6/2001 | Andrews | F02D 41/1448 123/436 |
| 6,338,326 | B1 * | 1/2002 | Ebeling | G01M 15/104 123/198 F |
| 6,357,287 | B1 * | 3/2002 | Jin | F02D 41/1498 73/114.05 |
| 7,188,023 | B1 * | 3/2007 | O'Daniel | F02D 41/0087 701/111 |
| 7,458,249 | B2 * | 12/2008 | Kassner | F02P 5/1516 73/114.02 |
| 10,139,314 | B2 * | 11/2018 | Hiroi | G07C 5/0825 |
| 2002/0014113 | A1 * | 2/2002 | Takaku | G01M 15/11 73/114.14 |
| 2003/0015026 | A1 * | 1/2003 | Chung | G01M 15/11 73/114.75 |
| 2004/0122585 | A1 * | 6/2004 | Aono | G01M 15/11 701/111 |
| 2006/0142926 | A1 * | 6/2006 | Yasui | G01M 15/11 701/111 |
| 2008/0236262 | A1 * | 10/2008 | Andrews | G01M 15/11 701/111 |
| 2009/0308145 | A1 * | 12/2009 | Suzuki | F02D 41/2451 180/65.28 |
| 2010/0031736 | A1 * | 2/2010 | Kushihama | G01M 15/11 73/114.04 |
| 2010/0152991 | A1 * | 6/2010 | Suzuki | F02D 29/00 701/99 |
| 2010/0218598 | A1 * | 9/2010 | Suzuki | G01M 15/11 73/114.04 |
| 2010/0288035 | A1 * | 11/2010 | Arakawa | G01M 15/11 73/114.03 |
| 2012/0310505 | A1 * | 12/2012 | Morgan | F02D 41/0097 701/102 |
| 2016/0040644 | A1 * | 2/2016 | Martin | F02P 5/1527 701/102 |
| 2016/0222893 | A1 * | 8/2016 | Ohta | F02P 9/002 |
| 2016/0333807 | A1 * | 11/2016 | Pathan | G01M 15/11 |
| 2017/0167952 | A1 * | 6/2017 | Hiroi | F02D 41/28 |
| 2017/0276083 | A1 * | 9/2017 | Saiki | G01M 15/11 |
| 2017/0276084 | A1 * | 9/2017 | Saiki | G01M 15/11 |
| 2017/0350333 | A1 * | 12/2017 | Glugla | F02D 35/0015 |
| 2018/0058367 | A1 * | 3/2018 | Ottikkutti | F02D 41/403 |
| 2018/0246011 | A1 * | 8/2018 | Katayama | G01M 15/11 |
| 2019/0128779 | A1 * | 5/2019 | Hotta | F02D 41/1498 |
| 2020/0165994 | A1 * | 5/2020 | Sase | F02D 41/0007 |
| 2020/0232408 | A1 * | 7/2020 | Sase | F02D 41/22 |
| 2022/0042473 | A1 * | 2/2022 | Sugimoto | G01M 15/11 |
| 2022/0050019 | A1 * | 2/2022 | Iwamoto | G01M 15/11 |
| 2022/0106918 | A1 * | 4/2022 | Sase | F02D 41/28 |
| 2022/0282684 | A1 * | 9/2022 | Ottikkutti | F02D 41/3094 |
| 2023/0250774 | A1 * | 8/2023 | Glugla | G01M 15/11 123/54.4 |

FOREIGN PATENT DOCUMENTS

| | | | |
|---|---|---|---|
| JP | 5-149182 | A | 6/1993 |
| JP | 2894847 | B2 | 5/1999 |
| JP | 2976684 | B2 | 11/1999 |
| JP | 2001-41098 | A | 2/2001 |
| JP | 2001-289111 | A | 10/2001 |
| JP | 2002-505418 | A | 2/2002 |
| JP | 2005-240658 | A | 9/2005 |
| JP | 2014-234814 | A | 12/2014 |
| JP | 2015-197074 | A | 11/2015 |
| JP | 2016-142181 | A | 8/2016 |
| JP | 2017-106417 | A | 6/2017 |
| JP | 2020-133527 | A | 8/2020 |
| WO | WO 99/44028 | A1 | 9/1999 |
| WO | WO 2014/195791 | A1 | 12/2014 |

OTHER PUBLICATIONS

International Search Report and Written Opinion of the International Searching Authority for International Application No. PCT/JP2022/022449, dated Aug. 16, 2022.

* cited by examiner

FIG. 5

| | | PULSATING COMPONENT SPECTRUM | |
|---|---|---|---|
| | | LARGE (EQUAL TO OR LARGER THAN FIRST THRESHOLD VALUE) | SMALL (SMALLER THAN FIRST THRESHOLD VALUE) |
| DIFFERENCE PARAMETER | LARGE (EQUAL TO OR LARGER THAN THIRD THRESHOLD VALUE) | – | PARTIAL MISFIRE |
| | SMALL (SMALLER THAN SECOND THRESHOLD VALUE) | NORMAL OPERATION | ALL-CYLINDER MISFIRE |

FIG. 10

| ABSOLUTE VALUE OF CHANGE RATE PARAMETER | | PULSATING COMPONENT SPECTRUM | |
|---|---|---|---|
| | | LARGE (EQUAL TO OR LARGER THAN FIRST THRESHOLD VALUE) | SMALL (SMALLER THAN FIRST THRESHOLD VALUE) |
| SMALL (EQUAL TO OR SMALLER THAN FIFTH THRESHOLD VALUE) | | NORMAL OPERATION | PARTIAL MISFIRE |
| LARGE (EXCEEDING FOURTH THRESHOLD VALUE) | | - | ALL-CYLINDER MISFIRE | ns
INTERNAL COMBUSTION ENGINE MISFIRE DETECTING DEVICE AND MISFIRE DETECTING METHOD

TECHNICAL FIELD

The present disclosure relates to an internal combustion engine misfire detecting device and a misfire detecting method.

The present application claims priority based on Japanese Patent Application No. 2021-093407 filed in Japan on Jun. 3, 2020, the contents of which are incorporated herein by reference.

BACKGROUND ART

In the related art, a misfire detecting device for detecting a misfire of an internal combustion engine is known. For example, a misfire detecting device disclosed in PTL 1 frequency-analyzes an engine angular acceleration acquired based on a detection result of a crank angle sensor. Further, the misfire detecting device individually determines, for each of cylinders, whether or not an inter-cylinder component of angular acceleration (a component corresponding to a cycle obtained by dividing one combustion cycle of an internal combustion engine by the number of cylinders of the internal combustion engine) is smaller than a threshold value based on a result of frequency analysis. Accordingly, the misfire detecting device determines whether or not a misfire has occurred in any one of a plurality of cylinders configuring the internal combustion engine.

CITATION LIST

Patent Literature

[PTL 1] Japanese Unexamined Patent Application Publication No. 2017-106417

SUMMARY OF INVENTION

Technical Problem

Since whether the misfire detecting device individually determines whether a misfire has occurred for each of the plurality of cylinders configuring the internal combustion engine, there is a possibility that it takes time to detect an all-cylinder misfire. As a result, there is a concern that the amount of non-combustion gas increases in response to occurrence of the all-cylinder misfire. For example, since the number of cylinders is large in a case where the internal combustion engine is a power generation engine, there is a concern that detection of the all-cylinder misfire is delayed and a large amount of non-combustion gas is generated.

An object of the present disclosure is to provide an internal combustion engine misfire detecting device and a misfire detecting method that can more quickly detect an all-cylinder misfire.

Solution to Problem

According to at least one embodiment of the present disclosure, there is provided an internal combustion engine misfire detecting device, The internal combustion engine misfire detecting device for detecting a misfire of an internal combustion engine having a plurality of cylinders, including:

a pulsating component acquisition unit for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;

A difference parameter acquisition unit for acquiring a difference parameter correlated with a degree of a difference in an operation of each of the plurality of cylinders; and an all-cylinder misfire determination unit for determining that an all-cylinder misfire has occurred in the internal combustion engine in a case where the pulsating component spectrum acquired by the pulsating component acquisition unit falls below a first threshold value and the difference parameter acquired by the difference parameter acquisition unit falls below a second threshold value.

According to at least one embodiment of the present disclosure, there is provided an internal combustion engine misfire detecting device, The internal combustion engine misfire detecting device for detecting a misfire of an internal combustion engine having a plurality of cylinders, including:

a pulsating component acquisition unit for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;

a change rate parameter acquisition unit for acquiring a change rate parameter that is an absolute value indicating a degree of a change in an operating parameter correlated with the overall operation status of the plurality of cylinders; and an all-cylinder misfire determination unit for determining that an all-cylinder misfire has occurred in the internal combustion engine in a case where the pulsating component spectrum acquired by the pulsating component acquisition unit falls below a first threshold value and an absolute value of the change rate parameter acquired by the change rate parameter acquisition unit exceeds a fourth threshold value.

According to at least one embodiment of the present disclosure, there is provided an internal combustion engine misfire detecting method, The internal combustion engine misfire detecting method for detecting a misfire of an internal combustion engine having a plurality of cylinders, including:

a pulsating component acquisition step for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;

A difference parameter acquisition step for acquiring a difference parameter correlated with a degree of a difference in an operation of each of the plurality of cylinders; and an all-cylinder misfire determination step for determining that an all-cylinder misfire has occurred in the internal combustion engine in a case where the pulsating component spectrum acquired through the pulsating component acquisition step falls below a first threshold value and the difference parameter acquired through the difference parameter acquisition step falls below a second threshold value.

According to at least one embodiment of the present disclosure, there is provided an internal combustion engine misfire detecting method, The internal combustion engine misfire detecting method for detecting a misfire of an internal combustion engine having a plurality of cylinders, including:
- a pulsating component acquisition step for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;
- a change rate parameter acquisition step for acquiring a change rate parameter that is an absolute value indicating a degree of a change in an operating parameter correlated with the overall operation status of the plurality of cylinders; and
- an all-cylinder misfire determination step for determining that an all-cylinder misfire has occurred in the internal combustion engine in a case where the pulsating component spectrum acquired through the pulsating component acquisition step falls below a first threshold value and an absolute value of the change rate parameter acquired through the change rate parameter acquisition step exceeds a fourth threshold value.

Advantageous Effects of Invention

With the present disclosure, the internal combustion engine misfire detecting device and the misfire detecting method that can more quickly detect an all-cylinder misfire can be provided.

BRIEF DESCRIPTION OF DRAWINGS

FIG. 5 is a matrix showing a relationship between a pulsating component spectrum, a difference parameter, an all-cylinder misfire, and a partial misfire according to the embodiment of the present disclosure.

FIG. 10 is a matrix showing a relationship between the pulsating component spectrum, a change rate parameter, the all-cylinder misfire, and the partial misfire according to the embodiment of the present disclosure.

DESCRIPTION OF EMBODIMENTS

Figure 1:
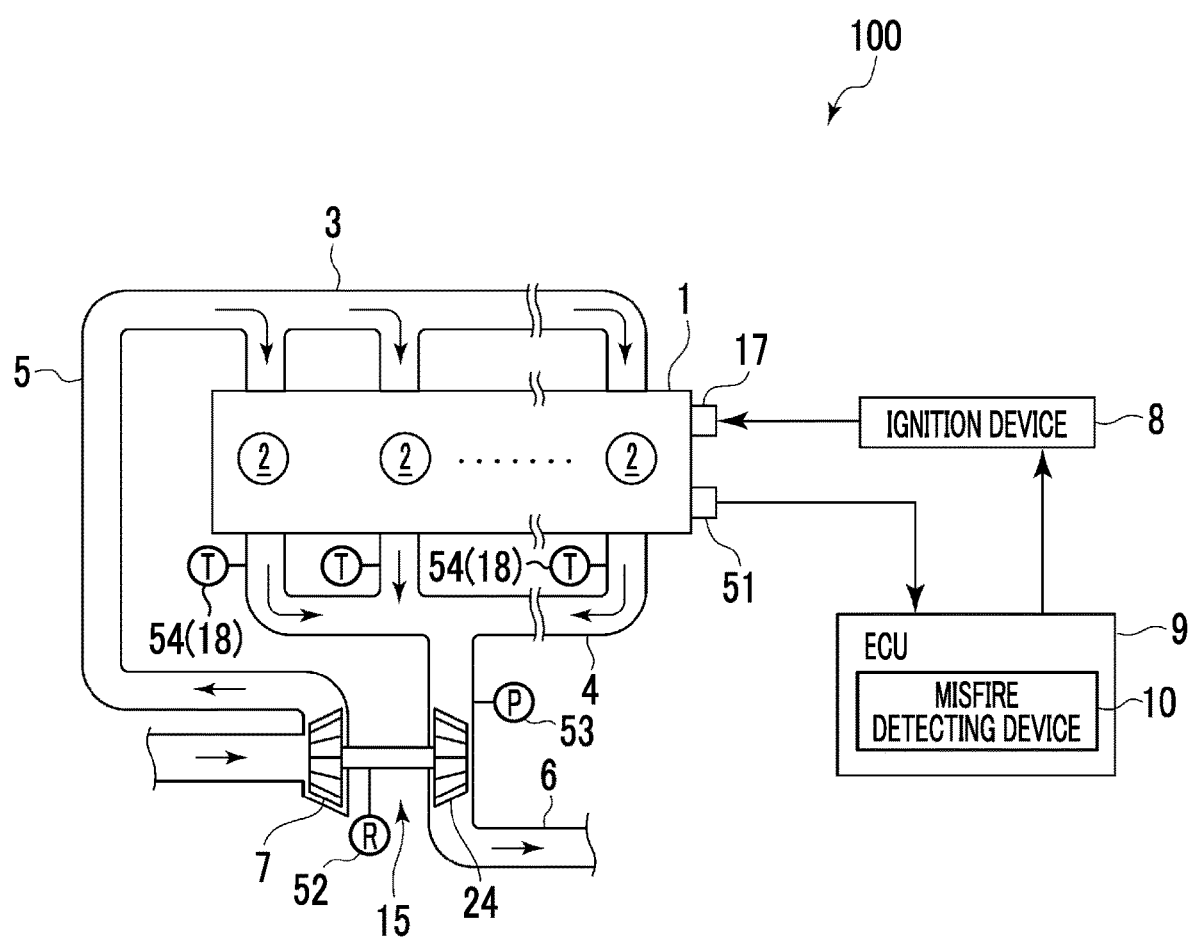
FIG. 1 is a conceptual diagram showing a schematic configuration of a misfire detecting system according to an embodiment of the present disclosure.

Hereinafter, some embodiments of the present disclosure will be described with reference to the accompanying drawings. However, dimensions, materials, shapes, and relative disposition of configuring components described in the embodiments or shown in the drawings are not intended to limit the scope of the present disclosure but are merely explanatory examples.

For example, an expression representing a relative or absolute disposition, such as "in a certain direction", "along a certain direction", "parallel", "orthogonal", "center", "concentric", and "coaxial", does not strictly represent only such a disposition, but also represents a state of being relatively displaced with a tolerance or with an angle or a distance to the extent that the same function can be obtained.

For example, an expression representing that objects are in an equal state, such as "identical", "equal", and "homogeneous", does not strictly represent only an equal state but also represents a state where there is a tolerance or a difference to the extent that the same function can be obtained.

For example, an expression representing a shape, such as a quadrangular shape and a cylindrical shape, does not represent only a shape such as a quadrangular shape and a cylindrical shape in a geometrically strict sense, but also represents a shape including an uneven portion, and a chamfered portion within a range in which the same effect can be obtained.

On the other hand, expressions, such as "comprising", "including", and "having" one component, are not exclusive expressions excluding the presence of other components.

The same configurations will be assigned with the same reference signs, and description thereof will be omitted in some cases.

<Example of Schematic Configuration of Misfire Detecting System 100>

FIG. 1 is a conceptual diagram showing a schematic configuration of a misfire detecting system according to an embodiment of the present disclosure. In some embodiments, a misfire detecting system 100 includes an internal combustion engine 1 and an internal combustion engine misfire detecting device 10 (hereinafter, simply referred to as a "misfire detecting device 10" in some cases). Hereinafter, examples of schematic configurations of the internal combustion engine 1 and the misfire detecting device 10 will be given.

The internal combustion engine 1 of the present example is a power generation gas engine that drives a generator by making a combustible gas supplied to each cylinder 2 combust. The internal combustion engine 1 has a plurality of cylinders 2. The number of the cylinders 2 may be any number such as four, eight, and sixteen. Each of the cylinders 2 communicates with an intake pipe 5 via an intake manifold 3 and communicates with an exhaust pipe 6 via an exhaust manifold 4. In addition, the internal combustion engine 1 is provided with a turbocharger 15 that has a compressor 7 provided at the intake pipe 5 and a turbine 24 provided at the exhaust pipe 6. The compressor 7 is configured to supply a compressed gas to each of the cylinders 2. The turbine 24 is configured to be rotated together with the compressor 7 by an exhaust gas exhausted from each of the plurality of cylinders 2.

In the present specification, the exhaust gas is a concept including a combustion gas and a non-combustion gas.

After being supplied to an inside of each of the cylinders 2, a combustible gas flowing in the intake pipe 5 combusts in response to ignition by an ignition plug 17. With the generation of a combustion gas, power is extracted, and a crank shaft (not shown) rotates. An exhaust gas exhausted from each of the cylinders 2 flows to the turbine 24 via the exhaust pipe 6.

In addition, ignition in each of the cylinders 2 is controlled by an ECU 9. Specifically, as the ECU 9 sends an ignition instruction signal to an ignition device 8, ignition by the ignition plug 17 is performed. When ignition is normally performed in each of the plurality of cylinders 2, the crank shaft is rotated at a specific rotation speed by power extracted in turn in each of the cylinders 2. Although one ignition plug 17 is shown in FIG. 1 which is a conceptual diagram, each of a plurality of ignition plugs 17 may be provided inside each of the cylinders 2.

The ECU 9 is configured by a computer and includes a processor, a memory, and an external communication interface. The processor is a CPU, a GPU, an MPU, a DSP, a combination thereof, or the like. The processor may be realized by an integrated circuit such as a PLD, an ASIC, a FPGA, and an MCU. The memory is configured to temporarily or non-temporarily store various types of data and is realized by, for example, a RAM, a ROM, a flash memory, or a combination thereof. As the processor processes data in accordance with a command of a program loaded in the memory, various types of control signals, such as an ignition instruction signal to be sent to the ignition device 8, are generated.

In the shown embodiment, the ECU 9 is electrically connected to a crank angle sensor 51, a turbo rotation speed sensor 52, a turbine pressure sensor 53, and each of a plurality of exhaust gas temperature sensors 54. However, for convenience of making the drawing easier to see, only the crank angle sensor 51 of the sensors is shown to be connected to the ECU 9 in FIG. 1 which is a conceptual diagram. The crank angle sensor 51 is configured to acquire a rotation angle of a crank shaft of the internal combustion engine 1. Therefore, the ECU 9 can acquire an engine rotation speed of the internal combustion engine 1 based on a detection result of the crank angle sensor 51. The turbo rotation speed sensor 52 is configured to detect a turbo rotation speed which is a rotation speed of the turbocharger 15. The turbine pressure sensor 53 is configured to detect an inlet exhaust gas pressure of the turbine 24 (that is, a pressure of an exhaust gas flowing into the turbine 24). The plurality of exhaust gas temperature sensors 54 are provided corresponding to the plurality of cylinders 2 respectively. Each of the exhaust gas temperature sensors 54 is configured to detect the temperature of an exhaust gas exhausted from the corresponding cylinder 2.

In other embodiments, any sensor of the crank angle sensor 51, the turbo rotation speed sensor 52, the turbine pressure sensor 53, and the exhaust gas temperature sensor 54 may not be provided. For example, the crank angle sensor 51 and the turbo rotation speed sensor 52 may be provided, and any of the other sensors may not be provided. Alternatively, the turbo rotation speed sensor 52 and the turbine pressure sensor 53 may be provided, and any of the other sensors may not be provided.

The ECU 9 according to the embodiment of the present disclosure includes the misfire detecting device 10. The misfire detecting device 10 is configured to detect a misfire in the internal combustion engine 1. As a more specific example, the misfire detecting device 10 is configured to detect an all-cylinder misfire, which is a misfire in all of the plurality of cylinders 2, and a partial misfire, which is a misfire only in any one cylinder 2 of the plurality of cylinders 2. The partial misfire is a concept including a misfire (one-cylinder misfire) that occurs only in any one of the plurality of cylinders 2 and a misfire that occurs only in any plurality of cylinders 2. In other embodiments, the misfire detecting device 10 may not detect a partial misfire.

The concepts of the internal combustion engine 1 and the misfire detecting device 10 have been described hereinbefore. Hereinafter, as an example of some embodiments of the present disclosure, a misfire detecting device 10A (10) according to a first embodiment and a misfire detecting device 10B (10) according to a second embodiment will be described in detail in turn.

<Detailed Description of Misfire Detecting Device 10A (10) According to First Embodiment>

Figure 2:
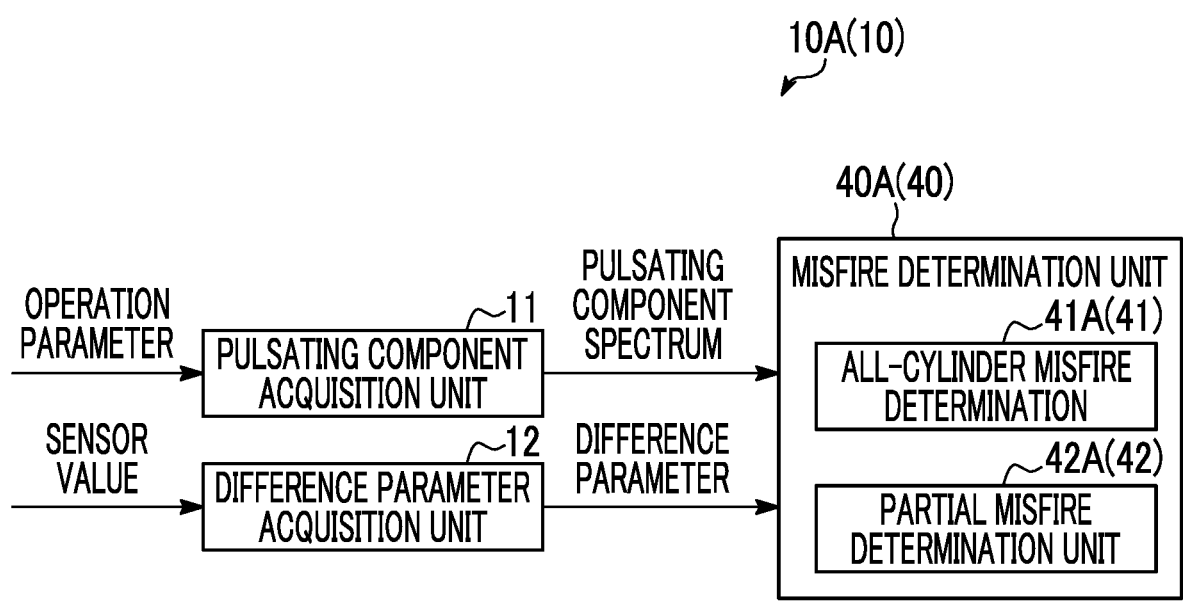
FIG. 2 is a conceptual diagram showing a configuration of a misfire detecting device according to a first embodiment of the present disclosure.

FIG. 2 is a conceptual diagram showing a configuration of the misfire detecting device according to the first embodiment of the present disclosure. The misfire detecting device 10A (10) includes a pulsating component acquisition unit 11, a difference parameter acquisition unit 12, and a misfire determination unit 40A (40).

The pulsating component acquisition unit 11 is configured to frequency-analyze operation parameter data 61 (see FIG. 3) indicating a change over time in an operation parameter and to acquire a pulsating component spectrum Sp (see FIG. 4) which is a spectrum at a frequency of pulsation of the internal combustion engine 1. The operation parameter is a parameter correlated with an overall operation status of the plurality of cylinders 2 (a specific example to be described later). For this reason, the operation parameter changes depending on presence or absence of pulsation and a degree of pulsation of the internal combustion engine 1. Frequency-analysis performed on the operation parameter data 61 is FFT, BPF, short-term Fourier transform (STFT) or the like.

The operation parameter is, for example, an engine rotation speed, an inlet exhaust gas pressure of the turbine 24, a turbo rotation speed, or the like. The pulsating component acquisition unit 11 acquires the operation parameter data 61 by continuously acquiring a detection result of the crank angle sensor 51, the turbo rotation speed sensor 52, or the turbine pressure sensor 53.

Figure 3:
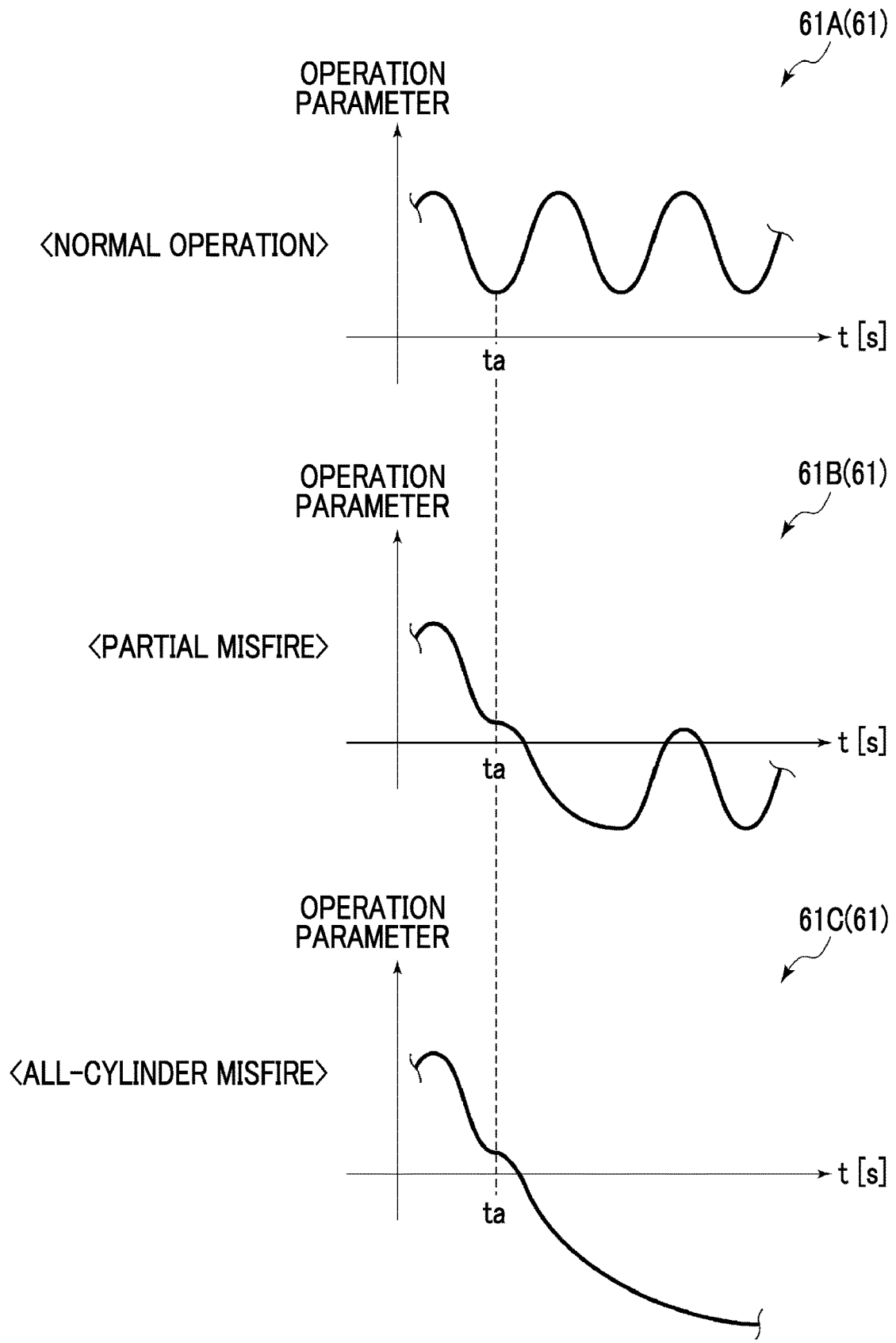
FIG. 3 is a graph conceptually showing operation parameter data according to the embodiment of the present disclosure.

FIG. 3 is a graph conceptually showing operation parameter data according to the embodiment of the present disclosure. Operation parameter data 61A (61) shows a case where all of the plurality of cylinders 2 operate normally without a misfire. The operation parameter at this time repeats a periodic change. Operation parameter data 61B (61) shows a case where a partial misfire has occurred in the internal combustion engine 1 (a one-cylinder misfire is given as an example in FIG. 3). In the operation parameter in this case, an ideal change in the operation parameter does not occur at a timing when combustion is supposed to occur in the misfired cylinder 2 (t=ta). Operation parameter data 61C (61) shows a case where an all-cylinder misfire has occurred in the internal combustion engine 1. In the operation parameter in this case, a periodic change in the operation parameter rarely occurs after a timing when the all-cylinder misfire has occurred (t≥ta). Therefore, when any one of the all-cylinder misfire and the partial misfire occurs, the pulsating component spectrum Sp described above significantly reduces (see FIG. 4).

Figure 4:
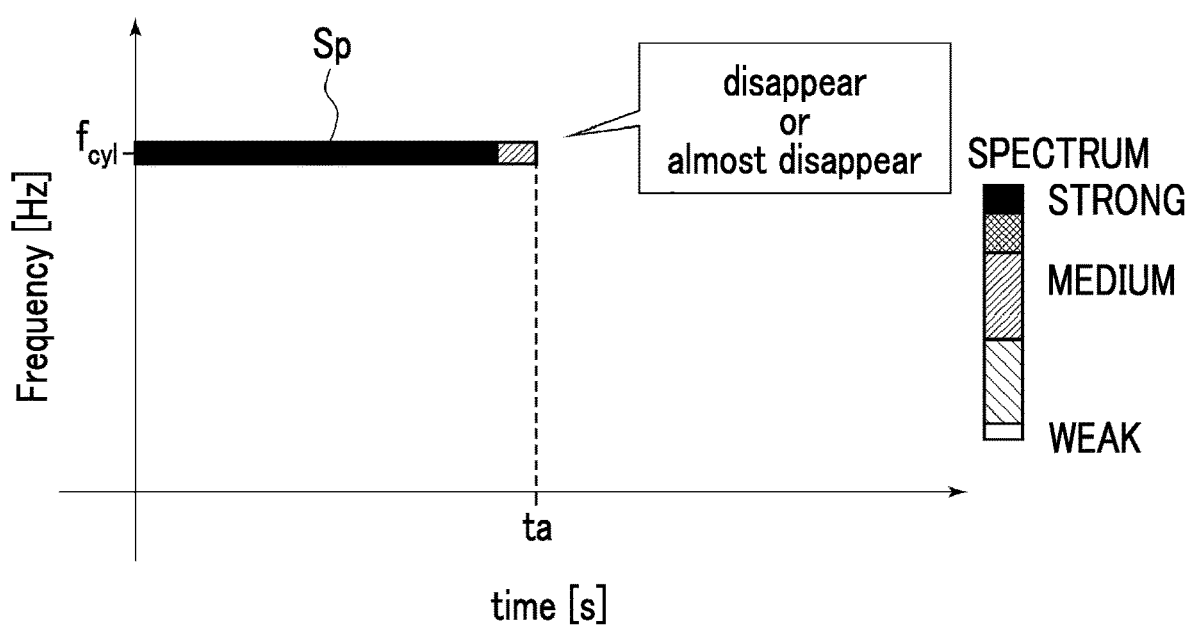
FIG. 4 is a graph conceptually showing a result of performing short-term Fourier transform on the operation parameter data according to the embodiment of the present disclosure.

FIG. 4 is a graph conceptually showing a result of performing short-term Fourier transform on operation parameter data according to the embodiment of the present disclosure. More specifically, in FIG. 4, a result of performing short-term Fourier transform on the operation parameter data 61C when an all-cylinder misfire occurs is given as an example.

On the vertical axis of the graph shown in FIG. 4, $f_{cy1}$ indicates a frequency of pulsation of the internal combustion engine 1. There is no problem even when $f_{cy1}$ deviates from an ideal value identified through a calculation formula, and a frequency at which a strong spectrum appears through frequency-analysis may be regarded as a frequency of pulsation. This is because the actual measured value deviates from the ideal value due to some factors during measurement.

As can be seen from FIG. 4, in a case where an all-cylinder misfire has occurred at a specific timing (t=ta), the pulsating component spectrum Sp disappears or almost disappears. Although details are not shown, the pulsating component spectrum Sp significantly decreases also in a case where a partial misfire has occurred. Therefore, it is possible to determine that an all-cylinder misfire or a partial misfire has occurred in the internal combustion engine 1 based on the pulsating component spectrum Sp. Hereinafter, a threshold value that is reference of the determination will be referred to as a first threshold value. The first threshold value may be identified through an experiment, may be identified through simulation or analysis, or may be identified through a combination thereof (the same also applies to a second threshold value, a third threshold value, a fourth threshold value, and a fifth threshold value to be described later).

Referring back to FIG. 2, the difference parameter acquisition unit 12 is configured to acquire a difference parameter correlated with a degree of a difference (variations) in each of operations of the plurality of cylinders 2. A specific example of the difference parameter will be described later. When an all-cylinder misfire occurs, none of the plurality of cylinders 2 operates normally, so that the difference parameter becomes small. As a result, the difference parameter at this time falls below a specific threshold value (hereinafter, referred to as the second threshold value). Also in a case where all of the plurality of cylinders 2 operate normally, similarly, the difference parameter is small and falls below the second threshold value. On the other hand, when a partial misfire occurs, any one of the plurality of cylinders 2 operates normally, and the remaining cylinders 2 do not operate normally. Therefore, the difference parameter at this time is large compared to a time when an all-cylinder misfire has occurred and a time of a normal operation when a misfire has not occurred and is equal to or larger than a specific threshold value (hereinafter, referred to as the third threshold value). The third threshold value is a value that is equal to or larger than the second threshold value, and an embodiment in which the third threshold value and the second threshold value are values identical to each other is not excluded.

FIG. 5 is a matrix showing a relationship between a pulsating component spectrum, a difference parameter, an all-cylinder misfire, and a partial misfire according to the embodiment of the present disclosure. As described above, when the pulsating component spectrum Sp acquired by the pulsating component acquisition unit 11 is equal to or larger than the first threshold value, it can be determined that an all-cylinder misfire and a partial misfire have not occurred. Thus, in a case where the difference parameter at this time falls below the second threshold value, it can be determined that all of the plurality of cylinders 2 operate normally. On the other hand, in a case where the pulsating component spectrum Sp falls below the first threshold value, it can be determined that an all-cylinder misfire or a partial misfire has occurred. In this case, further, when the difference parameter acquired by the difference parameter acquisition unit 12 falls below the second threshold value, it can be determined that an all-cylinder misfire has occurred, and when the difference parameter is equal to or larger than the third threshold value, it can be determined that a partial misfire has occurred.

The misfire determination unit 40A (40) shown in FIG. 2 includes an all-cylinder misfire determination unit 41A (41). The all-cylinder misfire determination unit 41A is configured to determine occurrence of an all-cylinder misfire in the internal combustion engine 1 in accordance with the reference described above using FIG. 5. That is, an all-cylinder misfire determination unit 41 is configured to determine that an all-cylinder misfire has occurred in the internal combustion engine 1 in a case where a spectrum acquired by the pulsating component acquisition unit 11 falls below the first threshold value and a difference parameter acquired by the difference parameter acquisition unit 12 falls below the second threshold value.

With the configuration, in a case where the pulsating component spectrum Sp falls below the first threshold value and a difference parameter falls below the second threshold value, the all-cylinder misfire determination unit 41A determines that an all-cylinder misfire has occurred. Since it is not necessary to individually determine whether a misfire has occurred in each of the plurality of cylinders 2, the misfire detecting device 10A can more quickly detect occurrence of an all-cylinder misfire. For example, in a case where the internal combustion engine 1 is applied to a power generation engine in which the number of the cylinders 2 is 16 or more, the number of the cylinders 2 tends to increase, and a large amount of non-combustion gas can be generated when an all-cylinder misfire occurs compared to a case where the internal combustion engine 1 is applied as a vehicle engine. In this point, as the all-cylinder misfire determination unit 41A quickly determines occurrence of an all-cylinder misfire as in the present disclosure, it is possible to perform appropriate processing before a large amount of non-combustion gas is generated.

In other embodiments, in a case where a spectrum acquired by the pulsating component acquisition unit 11 is equal to or larger than the first threshold value and a difference parameter acquired by the difference parameter acquisition unit 12 falls below the second threshold value, the all-cylinder misfire determination unit 41A may determine that the internal combustion engine 1 operates normally.

In the embodiment given as an example in FIG. 2, the misfire determination unit 40A (40) includes a partial misfire determination unit 42A (42). The partial misfire determination unit 42A is configured to determine occurrence of a partial misfire in the internal combustion engine 1 in accordance with the reference described above using FIG. 5. Specifically, the partial misfire determination unit 42A is configured to determine that a partial misfire has occurred in the internal combustion engine 1 in a case where the pulsating component spectrum Sp acquired by the pulsating component acquisition unit 11 falls below the first threshold value and a difference parameter acquired by the difference parameter acquisition unit 12 is equal to or larger than the third threshold value.

With the configuration, the misfire detecting device 10A can identify whether a misfire which has occurred in the internal combustion engine 1 is a partial misfire or an all-cylinder misfire with high accuracy as the partial misfire determination unit 42A and the all-cylinder misfire determination unit 41A are included.

<First Example of Details of Difference Parameter Acquisition Unit 12>

Figure 6A:
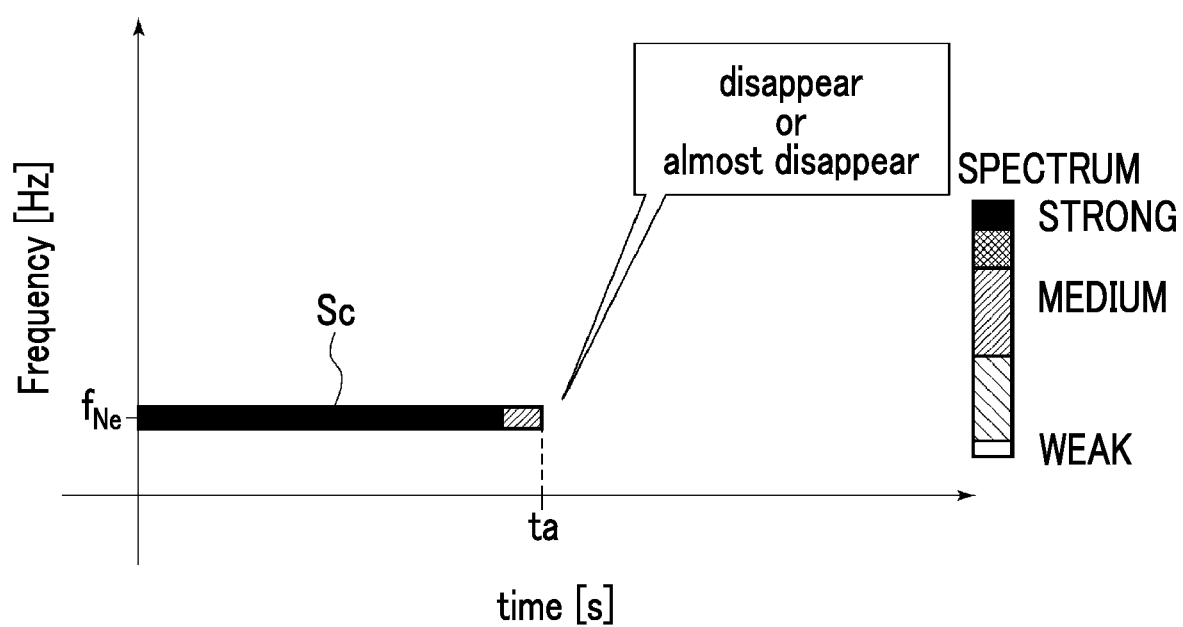
FIG. 6A is a graph conceptually showing a result of performing short-term Fourier transform on target data according to the embodiment of the present disclosure.

A first example of details of the difference parameter acquisition unit 12 will be described with reference to FIGS. 2 and 6A. FIG. 6A is a graph conceptually showing a result of performing short-term Fourier transform on target data according to the embodiment of the present disclosure.

The difference parameter acquisition unit 12 is configured to frequency-analyze target data indicating a change over time in a sensor value detected by a single sensor. The single sensor is, for example, the crank angle sensor 51, the turbo rotation speed sensor 52, or the turbine pressure sensor 53. Therefore, the sensor value in this case is an engine rotation speed, a turbo rotation speed, or an inlet exhaust gas pressure of the turbine 24. Therefore, the sensor value acquired by the difference parameter acquisition unit 12 may be the same as the operation parameter acquired by the pulsating component acquisition unit 11 described above. All of the sensor values is correlated with a degree of a difference in an operation of each of the plurality of cylinders 2. The correlation becomes clearer by frequency-analyzing target data indicating a change over time in a sensor value. Thus, the difference parameter acquisition unit 12 is configured to frequency-analyze target data and to acquire a cycle component spectrum Sc (see FIG. 6B) which is a spectrum at a frequency for one cycle of the internal combustion engine 1 as a difference parameter. For example, one cycle of the internal combustion engine 1 functioning as a four-cycle engine completes each time the internal combustion engine 1 makes two rotations, and for example, one cycle of the internal combustion engine 1 functioning as a two-cycle engine completes each time the internal combustion engine 1 makes one rotation.

The graph given as an example in FIG. 6A shows a spectrum when an all-cylinder misfire occurs as in FIG. 4. In addition, $f_{Ne}$ at the vertical axis of the graph of FIG. 6A is a frequency corresponding to one cycle of the internal combustion engine 1. $f_{Ne}$ may deviate from an ideal value acquired through calculation, like $f_{cy1}$. When an all-cylinder misfire occurs (t=ta), a sensor value rarely changes periodically (not shown), and the cycle component spectrum Sc disappears or almost disappears (falls below the second threshold value). Although details are not shown, since periodic changes partially occur in the sensor value when a partial misfire occurs, the cycle component spectrum Sc is equal to or larger than the third threshold value.

Therefore, in the first example, the all-cylinder misfire determination unit 41A can determine that an all-cylinder misfire has occurred in a case where the pulsating component spectrum Sp falls below the first threshold value and the cycle component spectrum Sc falls below the second threshold value. In addition, the partial misfire determination unit 42A can determine that a partial misfire has occurred in a case where the pulsating component spectrum Sp falls below the first threshold value and the cycle component spectrum Sc is equal to or larger than the third threshold value.

With the configuration, the all-cylinder misfire determination unit 41A can determine whether an all-cylinder misfire has occurred based on the cycle component spectrum Sc. In addition, since the cycle component spectrum Sc, which is difference data, is acquired based on a sensor value detected by a single sensor, the cycle component spectrum Sc is detected with a simpler configuration. Accordingly, a configuration for detecting occurrence of an all-cylinder misfire can be made simpler. In addition, for the same reason, a configuration for detecting occurrence of a partial misfire can be made simpler.

In the embodiment of the present disclosure, the sensor value described above is identical to an operation parameter, and target data indicating a change over time in the sensor value is identical to the operation parameter data 61 (see FIG. 3). That is, the operation parameter data 61 is frequency-analyzed by both of the pulsating component acquisition unit 11 and the difference parameter acquisition unit 12. In this case, the graph shown in FIG. 6A can be superimposed and reflected on the graph shown in FIG. 4. With the configuration, as data is frequency-analyzed based on the sensor value detected by a single sensor, both of the pulsating component spectrum Sp and the cycle component spectrum Sc are acquired. Accordingly, a configuration for detecting occurrence of an all-cylinder misfire can be made simpler. In addition, for the same reason, a configuration for detecting occurrence of a partial misfire can be made simpler.

An operation parameter according to the embodiment of the present disclosure is a sensor value of the turbo rotation speed sensor 52 or the turbine pressure sensor 53. That is, the sensor value described above is a turbine rotation speed or an inlet exhaust gas pressure of the turbine 24. The two sensor values quickly respond to an all-cylinder misfire that occurs in the internal combustion engine 1. That is, when an all-cylinder misfire occurs in the internal combustion engine 1, the pulsating component spectrum Sp responds (decreases) relatively quickly based on any one of the two sensor values. Accordingly, with the configuration, the misfire detecting device 10A can more quickly detect occurrence of an all-cylinder misfire. In addition, in the embodiment in which the sensor value described above is identical to the operation parameter, the misfire detecting device 10 can also more quickly detect a partial misfire.

<Second Example of Details of Difference Parameter Acquisition Unit 12>

Figure 6B:
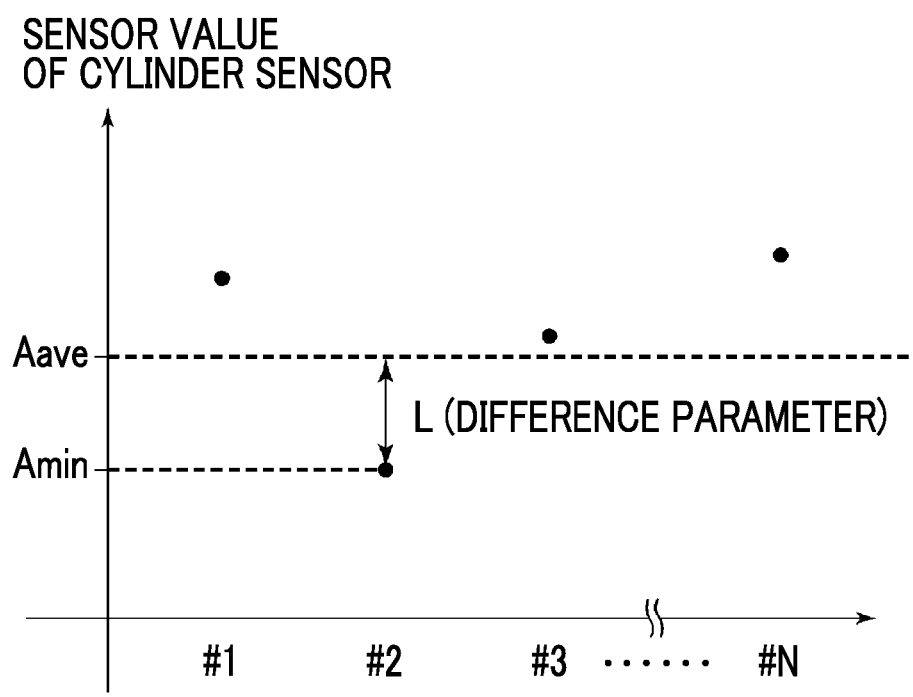
FIG. 6B is a graph conceptually showing a relationship between sensor values of a plurality of cylinder sensors and the difference parameter according to the embodiment of the present disclosure.

A second example of details of the difference parameter acquisition unit 12 will be described with reference to FIGS. 1, 2, and 6B. FIG. 6B is a graph conceptually showing a relationship between detection results of a plurality of cylinder sensors 18 and a difference parameter according to the embodiment of the present disclosure.

In the second example, instead of using a single sensor as in the first example, a plurality of sensors are used. As a specific example, the difference parameter acquisition unit 12 is configured to analyze a sensor value detected by each of the plurality of cylinder sensors 18 and to acquire a difference parameter. Each of the plurality of cylinder sensors 18 is configured to detect an operation state of each of the plurality of cylinders 2. In the embodiment given as an example in FIG. 1, the cylinder sensor 18 is the exhaust gas temperature sensor 54, and the sensor value is a temperature of an exhaust gas in the cylinder 2. That is, the difference parameter acquisition unit 12 of the present example is configured to analyze the temperature of the exhaust gas, which is detected by each of the plurality of exhaust gas temperature sensors 54.

Therefore, the all-cylinder misfire determination unit 41A can determine that an all-cylinder misfire has occurred in a case where the pulsating component spectrum Sp falls below the first threshold value and a difference parameter based on each of detection results of the plurality of cylinder sensors 18 falls below the second threshold value. In addition, the partial misfire determination unit 42A can determine that a partial misfire has occurred in a case where the pulsating component spectrum Sp falls below the first threshold value and the difference parameter is equal to or larger than the third threshold value.

With the configuration, a difference parameter acquired based on each of detection results of the plurality of cylinder sensors 18 is strongly correlated with a degree of a difference in an operation of each of the plurality of cylinders 2. Therefore, the difference parameter greatly changes depending on whether any one of an all-cylinder misfire and a partial misfire occurs. Accordingly, the all-cylinder misfire determination unit 41A can detect an all-cylinder misfire in the internal combustion engine 1 with higher accuracy. In addition, based on the detection results of the cylinder sensors 18, which are the exhaust gas temperature sensors 54, the all-cylinder misfire determination unit 41A determines whether an all-cylinder misfire has occurred in the internal combustion engine 1. Detection results of the exhaust gas temperature sensors 54 can easily reflect a difference in operations of the plurality of cylinders 2. Accordingly, the misfire determination unit 40A can accurately detect occurrence of an all-cylinder misfire. In addition, whether the occurred misfire is an all-cylinder misfire or a partial misfire can also be accurately identified.

In other embodiments, the plurality of cylinder sensors 18 may be configured to detect an exhaust gas pressure or an exhaust gas flow rate of the corresponding cylinder 2. Even in this case, since a difference parameter acquired based on each of detection results of the plurality of cylinder sensors 18 is strongly correlated with a degree of a difference in an operation of each of the plurality of cylinders 2, an all-cylinder misfire in the internal combustion engine 1 can be detected with high accuracy. In addition, whether the occurred misfire is an all-cylinder misfire or a partial misfire can also be accurately identified.

A number shown at the horizontal axis of the graph of FIG. 6B corresponds to any one of the plurality of cylinders 2, and N shown in the graph is the same value as the number of the cylinders 2. In addition, the vertical axis of the graph of FIG. 6B indicates a sensor value which is a detection result of the cylinder sensor 18.

The difference parameter acquisition unit 12 according to the embodiment of the present disclosure is configured to acquire a value (a value corresponding to a length L) obtained by subtracting a minimum value $A_{min}$ of respective sensor values of the plurality of cylinder sensors 18 from an average value $A_{ave}$ of the plurality of sensor values as a difference parameter. With the configuration, the difference parameter indicating a difference in an operation of each of the plurality of cylinders 2 can be easily identified.

<Misfire Detecting Method According to First Embodiment>

Figure 7:
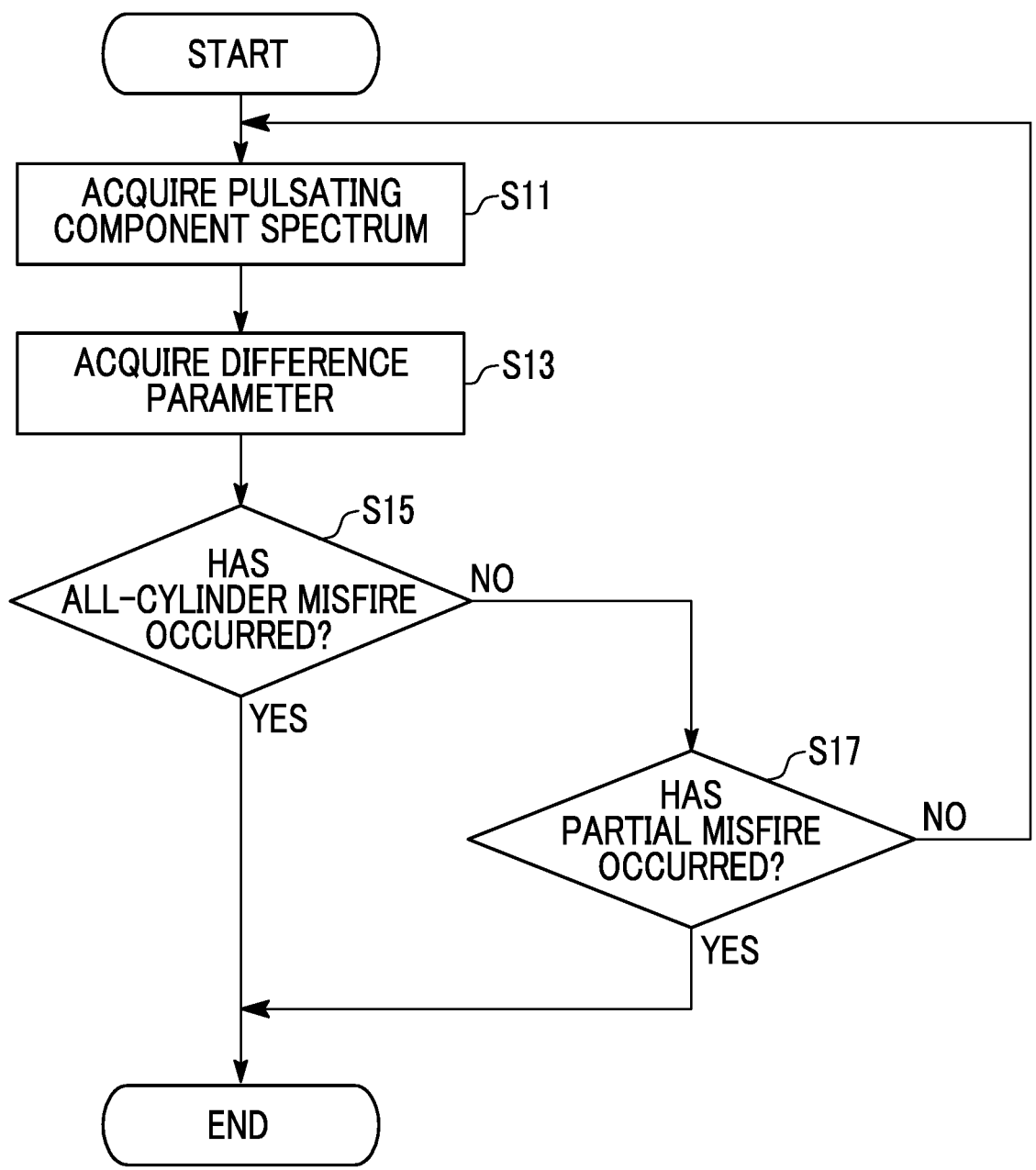
FIG. 7 is a flowchart showing an internal combustion engine misfire detecting method according to the first embodiment of the present disclosure.

FIG. 7 is a flowchart showing an internal combustion engine misfire detecting method according to the first embodiment of the present disclosure. The present flowchart is executed by, for example, the misfire detecting device 10A (see FIG. 2). When the present detecting method is started, the internal combustion engine 1 is driven. In the following description, steps will be abbreviated as "S" in some cases.

First, the pulsating component spectrum Sp is acquired by the pulsating component acquisition unit 11 described above (S11), and after then, a difference parameter is acquired by the difference parameter acquisition unit 12 described above (S13). Further, whether an all-cylinder misfire has occurred is determined by the all-cylinder misfire determination unit 41A described above (S15). In a case where it is determined that the all-cylinder misfire has occurred (S15: YES), the present detecting method ends. At this time, some notification processing may be executed.

In a case where it is determined that the all-cylinder misfire has not occurred (S15: NO), whether a partial misfire has occurred is determined by the partial misfire determination unit 42A described above (S17). In a case where it is determined that the partial misfire has occurred (S17: YES), the present detecting method ends. On the other hand, in a case where it is determined that the partial misfire has not occurred (S17: NO), the step returns to S11. While the internal combustion engine 1 operates normally without causing a misfire, S11 to S17 are repeatedly executed.

In other embodiments, S17 may not be executed. In addition, S17 may be executed before S15 is executed.

<Detailed Description of Misfire Detecting Device 10B (10) According to Second Embodiment>

Figure 8:
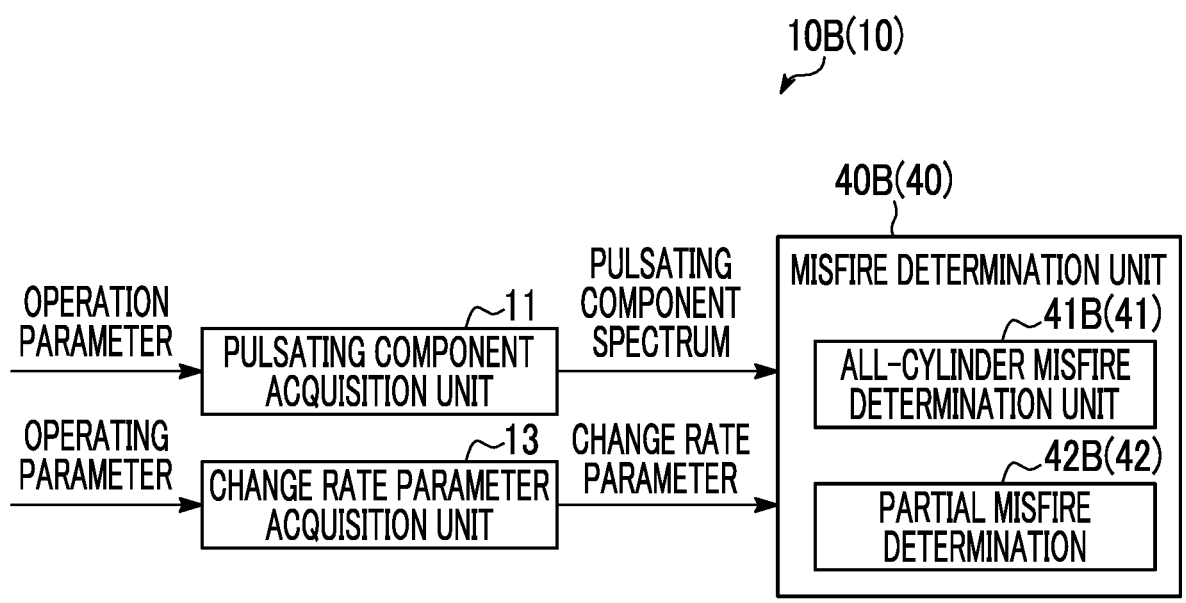
FIG. 8 is a conceptual diagram showing a configuration of a misfire detecting device according to a second embodiment of the present disclosure.

FIG. 8 is a conceptual diagram showing a configuration of a misfire detecting device according to the second embodiment of the present disclosure. Hereinafter, in description of the misfire detecting device 10B according to the second embodiment, identical configurations as in the misfire detecting device 10A according to the first embodiment will be assigned with identical reference signs in the drawings, and some or whole description thereof will be omitted. The misfire detecting device 10B (10) of the present example is configured to detect an all-cylinder misfire and a partial misfire, but may not detect a partial misfire.

The misfire detecting device 10B includes a change rate parameter acquisition unit 13 instead of the difference parameter acquisition unit 12 described above (see FIG. 2). The change rate parameter acquisition unit 13 is configured to acquire a change rate parameter indicating a degree of a change in an operating parameter (change speed). The operating parameter is a parameter correlated with an overall operation status of the plurality of cylinders 2. The operating parameter is, for example, an engine rotation speed, a turbo rotation speed, an inlet exhaust gas pressure of the turbine 24, or the like. The operating parameter may be a parameter different from an operation parameter or may be a parameter identical to the operation parameter.

Figure 9:
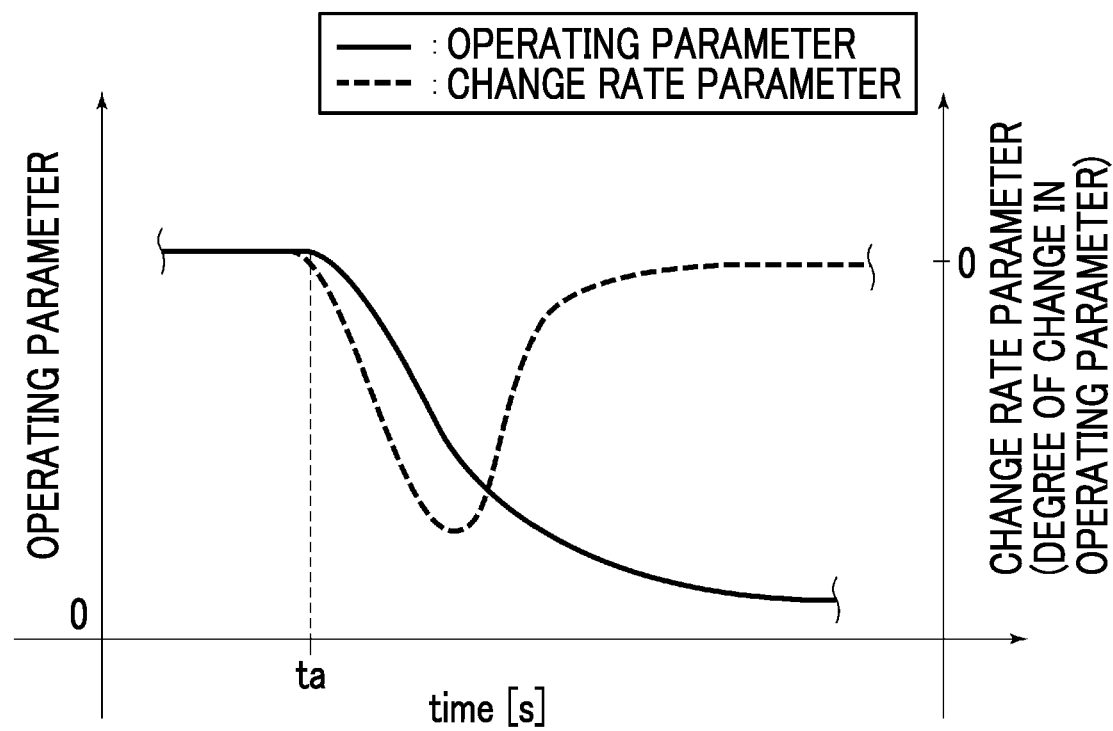
FIG. 9 is a graph showing changes over time in an operating parameter and a change rate parameter according to the embodiment of the present disclosure.

FIG. 9 is a graph showing changes over time in an operating parameter and a change rate parameter according to the embodiment of the present disclosure. The operating parameter given as an example in FIG. 9 is an engine rotation speed. In the graph of FIG. 9, an all-cylinder misfire occurs at a timing of t=ta. As can be seen from the graph, when the all-cylinder misfire occurs, the operating parameter changes greatly (decreases in the example of FIG. 9), and also the change rate parameter changes greatly (decreases in the example of FIG. 9). Therefore, the absolute value of the change rate parameter becomes large. Although details are not shown, since some of the cylinders 2 operate normally when a partial misfire occurs, the operating parameter and the change rate parameter somewhat change, but do not greatly change as much as when an all-cylinder misfire occurs. In addition, in a case where all of the plurality of cylinders 2 operate normally, a change amount of the change rate parameter is even smaller than a time when a partial misfire occurs. The tendencies of the change rate parameters of a time when a partial misfire occurs and a time when the internal combustion engine 1 operates normally are the same as in a case where the operating parameter is a parameter other than the engine rotation speed.

Therefore, in a case where the pulsating component spectrum Sp has fallen below the first threshold value, when the absolute value of a change rate parameter exceeds a specific threshold value (hereinafter, referred to as the fourth threshold value), it can be determined that an all-cylinder misfire has occurred. In addition, in a case where the pulsating component spectrum Sp has fallen below the first threshold value, when the absolute value of the change rate parameter is equal to or smaller than the fifth threshold value, it can be determined that a partial misfire has occurred. The fifth threshold value is a value that is equal to or smaller than the fourth threshold value, and an embodiment in which the fifth threshold value and the fourth threshold value are values identical to each other is not excluded. Further, in a case where the pulsating component spectrum Sp has become equal to or larger than the first threshold value, when the absolute value of the change rate parameter is equal to or smaller than the fifth threshold value (or equal to or smaller than a specific value smaller than the fifth threshold value), it can be determined that the internal combustion engine 1 operates normally.

FIG. 10 is a matrix showing a relationship between a frequency spectrum, a change rate parameter, an all-cylinder misfire, and a partial misfire according to the embodiment of the present disclosure. As described above using FIG. 5, when the pulsating component spectrum Sp acquired by the pulsating component acquisition unit 11 is equal to or larger than the first threshold value, it can be determined that an all-cylinder misfire and a partial misfire have not occurred. In a case where the absolute value of a change rate parameter at this time is equal to or smaller than the fifth threshold value (or equal to or smaller than a specific value smaller than the fifth threshold value), it can be determined that the internal combustion engine 1 operates normally. On the other hand, in a case where the pulsating component spectrum Sp falls below the first threshold value, it can be determined that an all-cylinder misfire or a partial misfire has occurred. In this case, further, when the absolute value of a change rate parameter acquired by the change rate parameter acquisition unit 13 exceeds the fourth threshold value, it can be determined that an all-cylinder misfire has occurred, and when the absolute value of a change rate parameter is equal to or smaller than the fifth threshold value, it can be determined that a partial misfire has occurred.

Referring back to FIG. 8, a misfire determination unit 40B (40) which is a component of the misfire detecting device 10B (10) includes an all-cylinder misfire determination unit 41B (41). The all-cylinder misfire determination unit 41B is configured to determine that an all-cylinder misfire has occurred in the internal combustion engine 1 in a case where the pulsating component spectrum Sp acquired by the pulsating component acquisition unit 11 falls below the first threshold value and the absolute value of a change rate parameter acquired by the change rate parameter acquisition unit 13 exceeds the fourth threshold value. In an embodiment in which the change rate parameter becomes a negative value, it may be determined that whether the change rate parameter falls below a value obtained by multiplying the fourth threshold value, which is a positive value, by −1. Even with this determination method, it can be determined whether the absolute value of the change rate parameter exceeds the fourth threshold value.

With the configuration, in a case where the pulsating component spectrum Sp falls below the first threshold value and the absolute value of a change rate parameter exceeds the fourth threshold value, the all-cylinder misfire determination unit 41B determines that an all-cylinder misfire has occurred. Since whether a misfire has occurred in each of the plurality of cylinders 2 is not individually determined, the misfire detecting device 10B can more quickly detect occurrence of an all-cylinder misfire.

In other embodiments, in a case where the pulsating component spectrum Sp acquired by the pulsating component acquisition unit 11 is equal to or larger than the first threshold value and the absolute value of a change rate parameter acquired by the change rate parameter acquisition unit 13 is equal to or smaller than the fifth threshold value (or equal to or smaller than a specific value smaller than the fifth threshold value), the all-cylinder misfire determination unit 41B may determine that the internal combustion engine 1 operates normally.

In the embodiment, the misfire determination unit 40B (40) includes a partial misfire determination unit 42B (42). The partial misfire determination unit 42B is configured to determine occurrence of a partial misfire in the internal combustion engine 1. That is, the partial misfire determination unit 42B is configured to determine that a partial misfire has occurred in the internal combustion engine 1 in a case where the pulsating component spectrum Sp acquired by the pulsating component acquisition unit 11 falls below the first threshold value and the absolute value of a change rate parameter acquired by the change rate parameter acquisition unit 13 is equal to or smaller than the fifth threshold value.

With the configuration, the misfire detecting device 10B can identify whether a misfire which has occurred in the internal combustion engine 1 is a partial misfire or an all-cylinder misfire with high accuracy as the partial misfire determination unit 42B and the all-cylinder misfire determination unit 41B are included.

In some embodiments, an operating parameter is a parameter that is identical to an operation parameter. That is, the change rate parameter acquisition unit 13 according to the embodiment of the present disclosure is configured to acquire the operation parameter as the operating parameter. With the configuration, as the operation parameter and the operating parameter are identical to each other, a configuration for determining whether an all-cylinder misfire has occurred can be made simpler. In addition, for the same reason, a configuration for detecting whether a partial misfire has occurred can be made simpler.

An operation parameter according to the embodiment of the present disclosure is a turbine rotation speed or an inlet exhaust gas pressure of the turbine 24. The turbine rotation speed or the inlet exhaust gas pressure of the turbine 24 quickly responses to an all-cylinder misfire that occurs in the internal combustion engine 1. With the configuration, the misfire detecting device 10B of the internal combustion engine 1 can more quickly detect occurrence of an all-cylinder misfire. In addition, in the embodiment in which the operating parameter described above is identical to the operation parameter, the misfire detecting device 10 can also more quickly detect a partial misfire.

<Misfire Detecting Method According to Second Embodiment>

Figure 11:
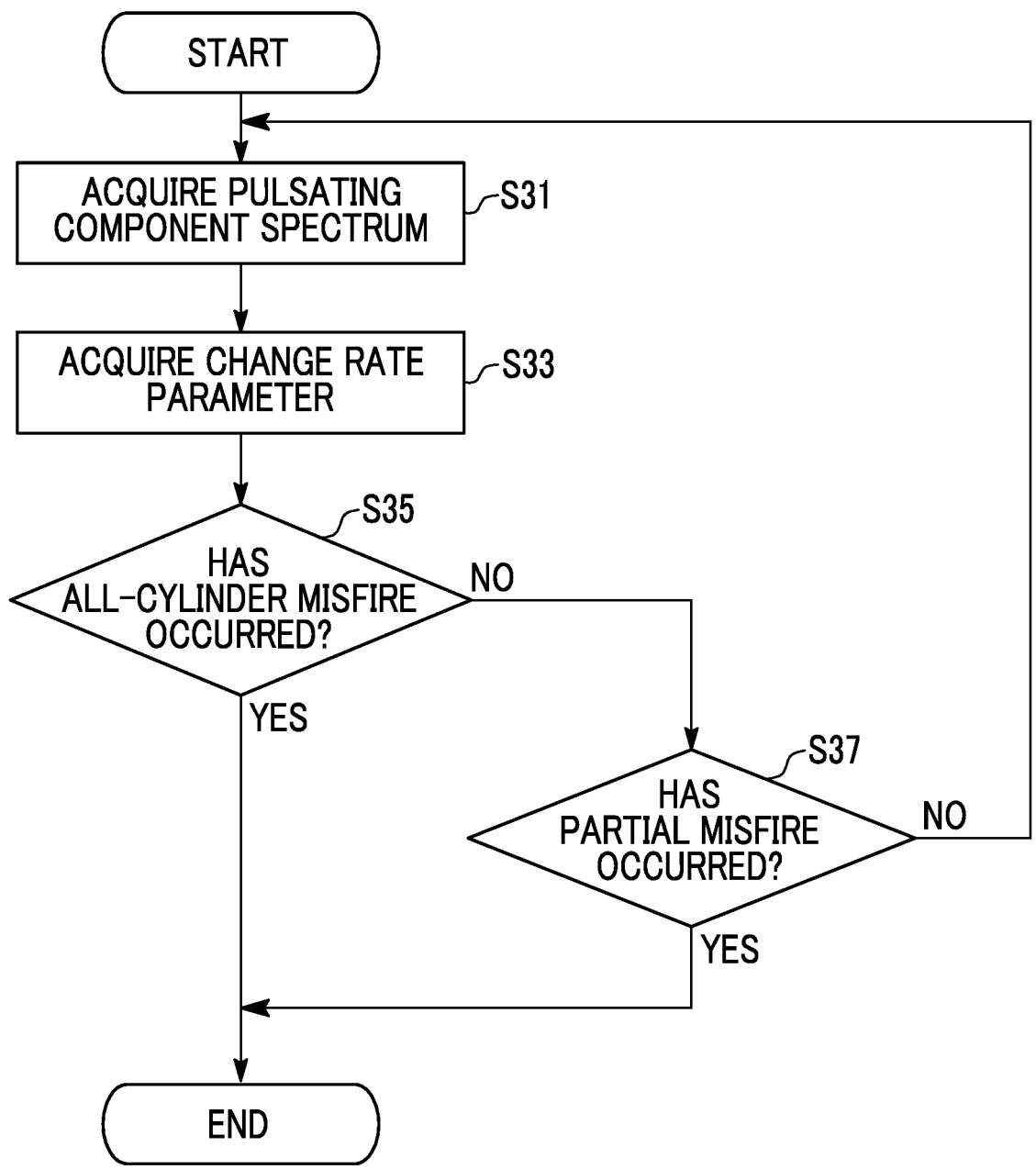
FIG. 11 is a flowchart showing an internal combustion engine misfire detecting method according to the second embodiment of the present disclosure.

FIG. 11 is a flowchart showing an internal combustion engine misfire detecting method according to the second embodiment of the present disclosure. The present flowchart is executed by, for example, the misfire detecting device 10B (see FIG. 8). When the present detecting method is started, the internal combustion engine 1 is driven.

First, the pulsating component spectrum Sp is acquired by the pulsating component acquisition unit 11 described above (S31), and after then, a change rate parameter is acquired by the change rate parameter acquisition unit 13 described above (S33). Further, whether an all-cylinder misfire has occurred is determined by the all-cylinder misfire determination unit 41B described above (S35). In a case where it is determined that the all-cylinder misfire has occurred (S35: YES), the present detecting method ends. At this time, some notification processing may be executed.

In a case where it is determined that the all-cylinder misfire has not occurred (S35: NO), whether a partial misfire has occurred is determined by the partial misfire determination unit 42B described above (S37). In a case where it is determined that the partial misfire has occurred (S37: YES), the present detecting method ends. On the other hand, in a case where it is determined that the partial misfire has not occurred (S37: NO), the step returns to S31. While the internal combustion engine 1 operates normally without causing a misfire, S31 to S37 are repeatedly executed.

SUMMARY

For example, the contents described in some embodiments described above are understood as follows.

1) An internal combustion engine misfire detecting device (10) according to at least one embodiment of the present disclosure, the internal combustion engine misfire detecting device (10) for detecting a misfire of an internal combustion engine (1) having a plurality of cylinders (2), including:
a pulsating component acquisition unit (11) for frequency-analyzing operation parameter data (61) indicating a change over time in an operation parameter correlated with an overall operation status of the plurality of cylinders (2) and acquiring a pulsating component spectrum (Sp) that is a spectrum at a frequency of pulsation of the internal combustion engine (1);
a difference parameter acquisition unit (12) for acquiring a difference parameter correlated with a degree of a difference in an operation of each of the plurality of cylinders (2); and
an all-cylinder misfire determination unit (41) for determining that an all-cylinder misfire has occurred in the internal combustion engine (1) in a case where the pulsating component spectrum (Sp) acquired by the pulsating component acquisition unit (11) falls below a first threshold value and the difference parameter acquired by the difference parameter acquisition unit (12) falls below a second threshold value.

When a partial misfire or an all-cylinder misfire of the internal combustion engine (1) occurs, since some or whole of periodic changes in the operation parameter before occurrence of a misfire disappears, the pulsating component spectrum (Sp) decreases. In addition, when a partial misfire of the internal combustion engine (1) occurs, a difference in operations of the plurality of cylinders (2) is large. On the other hand, when an all-cylinder misfire of the internal combustion engine (1) occurs, a difference in operations of the plurality of cylinders (2) is small, and a difference parameter at this time is small. With the configuration of 1) above, in a case where the pulsating component spectrum falls below the first threshold value and the difference parameter falls below the second threshold value, the all-cylinder misfire determination unit (41) determines that an all-cylinder misfire has occurred. Since whether a misfire has occurred in each of the plurality of cylinders (2) is not individually determined, the internal combustion engine misfire detecting device (10) can more quickly detect occurrence of an all-cylinder misfire.

2) In some embodiments, the internal combustion engine misfire detecting device (10) according to 1) above, further including:
a partial misfire determination unit (42) for determining that a partial misfire has occurred in the internal combustion engine (1) in a case where the pulsating component spectrum (Sp) acquired by the pulsating component acquisition unit (11) falls below the first threshold value and the difference parameter acquired by the difference parameter acquisition unit (12) is equal to or larger than a third threshold value that is a value which is equal to or larger than the second threshold value.

With the configuration of 2) above, the internal combustion engine misfire detecting device (10) can identify whether a misfire which has occurred in the internal combustion engine (1) is a partial misfire or an all-cylinder misfire with high accuracy as the partial misfire determination unit (42) and the all-cylinder misfire determination unit (41) are included.

3) In some embodiments, the internal combustion engine misfire detecting device (10) according to 1) or 2) above, in which the difference parameter acquisition unit (12) is configured to frequency-analyze target data indicating a change over time in a sensor value detected by a single sensor that is a sensor value correlated with the degree of the difference and to acquire a cycle component spectrum (Sc) that is a spectrum at a frequency for one cycle of the internal combustion engine (1) as the difference parameter.

The cycle component spectrum Sc acquired by frequency-analyzing target data is correlated with a degree of a difference in operations of the plurality of cylinders 2. That is, when a partial misfire occurs in the internal combustion engine (1), the cycle component spectrum (Sc) is large, and when an all-cylinder misfire occurs in the internal combustion engine (1), the cycle component spectrum (Sc) is small. With the configuration of 3) above, the all-cylinder misfire determination unit (41) can determine whether an all-cylinder misfire has occurred based on the cycle component spectrum (Sc). In addition, since the difference data is acquired based on a sensor value detected by a single sensor, the cycle component spectrum (Sc) which is a difference parameter is detected with a simpler configuration. Accordingly, a configuration for detecting occurrence of an all-cylinder misfire of the internal combustion engine (1) can be made simpler.

4) In some embodiments, the internal combustion engine misfire detecting device (10) according to 3) above,
in which the difference parameter acquisition unit (12) is configured to frequency-analyze the operation parameter data (61) as the target data.

With the configuration of 4) above, as a sensor value detected by a single sensor is frequency-analyzed, both of the pulsating component spectrum (Sp) and the cycle component spectrum (Sc) are acquired. Accordingly, a configuration for detecting occurrence of an all-cylinder misfire can be made simpler.

5) In some embodiments, the internal combustion engine misfire detecting device (10) according to 3) or 4) above,
in which the operation parameter is a rotation speed of a turbine (24) that is rotated by an exhaust gas exhausted from each of the plurality of cylinders (2) or an inlet exhaust gas pressure of the turbine (24).

The rotation speed of the turbine (24) or the inlet exhaust gas pressure of the turbine (24) quickly responses to an all-cylinder misfire that occurs in the internal combustion engine (1). With the configuration of 5) above, the internal combustion engine misfire detecting device (10) can more quickly detect occurrence of an all-cylinder misfire.

6) In some embodiments, the internal combustion engine misfire detecting device (10) according to 1) or 2) above,
in which the difference parameter acquisition unit (12) is configured to analyze a sensor value detected by each of a plurality of cylinder sensors (18) for detecting an operation state of each of the plurality of cylinders (2) and to acquire the difference parameter.

With the configuration of 6) above, the difference parameter acquired based on each of detection results of the plurality of cylinder sensors (18) is strongly correlated with a degree of a difference in each of operations of the plurality of cylinders (2). Therefore, the all-cylinder misfire determination unit (41) can detect an all-cylinder misfire in the internal combustion engine (1) with higher accuracy.

7) In some embodiments, the internal combustion engine misfire detecting device (10) according to 6) above, in which the difference parameter acquisition unit (12) is configured to analyze a temperature of an exhaust gas detected by each of the plurality of cylinder sensors (18).

With the configuration of 7) above, the all-cylinder misfire determination unit (41) can determine whether an all-cylinder misfire has occurred in the internal combustion engine (1) based on a detection result of the cylinder sensor (18) functioning as an exhaust temperature sensor.

8) In some embodiments, the internal combustion engine misfire detecting device (10) according to 6) or 7) above,
in which the difference parameter acquisition unit (12) is configured to acquire, as the difference parameter, a value obtained by subtracting a minimum value of the plurality of sensor values from an average value of the plurality of sensor values.

With the configuration of 8) above, a difference parameter indicating a difference in an operation of each of the plurality of cylinders (2) can be easily identified.

9) An internal combustion engine misfire detecting device (10) according to at least one embodiment of the present disclosure,
the internal combustion engine misfire detecting device (10) for detecting a misfire of an internal combustion engine (1) having a plurality of cylinders (2), including:
a pulsating component acquisition unit (11) for frequency-analyzing operation parameter data (61) indicating a change over time in an operation parameter correlated with an overall operation status of the plurality of cylinders (2) and acquiring a pulsating component spectrum (Sp) that is a spectrum at a frequency of pulsation of the internal combustion engine (1);
a change rate parameter acquisition unit (13) for acquiring a change rate parameter indicating a degree of a change in an operating parameter correlated with an overall operation status of the plurality of cylinders (2); and
an all-cylinder misfire determination unit (41) for determining that an all-cylinder misfire has occurred in the internal combustion engine (1) in a case where the pulsating component spectrum (Sp) acquired by the pulsating component acquisition unit (11) falls below a first threshold value and an absolute value of the change rate parameter acquired by the change rate parameter acquisition unit (13) exceeds a fourth threshold value.

When a partial misfire or an all-cylinder misfire of the internal combustion engine (1) occurs, since some or whole of periodic changes in the operation parameter before occurrence of a misfire disappears, the pulsating component spectrum (Sp) decreases. In addition, when a partial misfire of the internal combustion engine (1) occurs, since some of the cylinders 2 operate normally, an absolute value of an operating parameter is small. On the other hand, when an all-cylinder misfire of the internal combustion engine (1) occurs, since all of the cylinders 2 do not operate normally, an absolute value of the change rate parameter is large. With the configuration of 9) above, the all-cylinder misfire determination unit (41) determines that an all-cylinder misfire has occurred in a case where a pulsating component spectrum falls below the first threshold value and the absolute value of the change rate parameter exceeds the fourth threshold value. Since whether a misfire has occurred in each of the plurality of cylinders (2) is not individually determined, the internal combustion engine misfire detecting device (10) can more quickly detect occurrence of an all-cylinder misfire.

10) In some embodiments, the internal combustion engine misfire detecting device (10) according to 9) above, further including:
a partial misfire determination unit (42) for determining that a partial misfire has occurred in the internal combustion engine (1) in a case where the pulsating component spectrum (Sp) acquired by the pulsating component acquisition unit (11) falls below the first threshold value and the absolute value of the change rate parameter acquired by the change rate parameter acquisition unit (13) is equal to or smaller than a fifth threshold value that is a value which is equal to or smaller than the fourth threshold value.

With the configuration of 10) above, the internal combustion engine misfire detecting device (10) can identify whether a misfire which has occurred in the internal combustion engine (1) is a partial misfire or an all-cylinder misfire with high accuracy as the partial misfire determination unit (42) and the all-cylinder misfire determination unit (41) are included.

11) In some embodiments, the internal combustion engine misfire detecting device (10) according to 9) or 10) above,
in which the change rate parameter acquisition unit (13) is configured to acquire the operation parameter as the operating parameter.

With the configuration of 11) above, as the operation parameter and the operating parameter are identical to each other, a configuration for determining whether an all-cylinder misfire has occurred can be made simpler.

12) In some embodiments, the internal combustion engine misfire detecting device (10) according to any one of 9) to 11) above,
in which the operation parameter is a rotation speed of a turbine (24) that is rotated by an exhaust gas exhausted from each of the plurality of cylinders (2) or an inlet exhaust gas pressure of the turbine (24).

The rotation speed of the turbine (24) or the inlet exhaust gas pressure of the turbine (24) quickly responses to an all-cylinder misfire that occurs in the internal combustion engine (1). With the configuration of 12) above, the internal combustion engine misfire detecting device (10) can more quickly detect occurrence of an all-cylinder misfire.

13) An internal combustion engine (1) misfire detecting method according to at least one embodiment of the present disclosure, the internal combustion engine (1) misfire detecting method for detecting a misfire of the internal combustion engine (1) having a plurality of cylinders (2), including:

a pulsating component acquisition step (S11) for frequency-analyzing operation parameter data (61) indicating a change over time in an operation parameter correlated with an overall operation status of the plurality of cylinders (2) and acquiring a pulsating component spectrum (Sp) that is a spectrum at a frequency of pulsation of the internal combustion engine (1);

a difference parameter acquisition step (S13) for acquiring a difference parameter correlated with a degree of a difference in an operation of each of the plurality of cylinders (2); and an all-cylinder misfire determination step (S15) for determining that an all-cylinder misfire has occurred in the internal combustion engine (1) in a case where the pulsating component spectrum (Sp) acquired through the pulsating component acquisition step falls below a first threshold value and the difference parameter acquired through the difference parameter acquisition step falls below a second threshold value.

With the configuration of 13) above, for the same reason as in 1) above, the detecting method for the internal combustion engine (1) that can more quickly detect occurrence of an all-cylinder misfire is realized.

14) An internal combustion engine (1) misfire detecting method according to at least one embodiment of the present disclosure, the internal combustion engine (1) misfire detecting method for detecting a misfire of the internal combustion engine (1) having a plurality of cylinders (2), including:

a pulsating component acquisition step (S31) for frequency-analyzing operation parameter data (61) indicating a change over time in an operation parameter correlated with an overall operation status of the plurality of cylinders (2) and acquiring a pulsating component spectrum (Sp) that is a spectrum at a frequency of pulsation of the internal combustion engine (1);

a change rate parameter acquisition step (S33) for acquiring a change rate parameter indicating a degree of a change in an operating parameter correlated with the overall operation status of the plurality of cylinders (2); and an all-cylinder misfire determination step (S35) for determining that an all-cylinder misfire has occurred in the internal combustion engine (1) in a case where the pulsating component spectrum (Sp) acquired through the pulsating component acquisition step falls below a first threshold value and an absolute value of the change rate parameter acquired through the change rate parameter acquisition step exceeds a fourth threshold value.

With the configuration of 14) above, for the same reason as in 9) above, the detecting method for the internal combustion engine (1) that can more quickly detect occurrence of an all-cylinder misfire is realized.

REFERENCE SIGNS LIST

1: internal combustion engine
2: cylinder
10: misfire detecting device
10A: misfire detecting device
10B: misfire detecting device
11: pulsating component acquisition unit
12: difference parameter acquisition unit
13: change rate parameter acquisition unit
18: cylinder sensor
24: turbine
40: misfire determination unit
41: all-cylinder misfire determination unit
42: partial misfire determination unit
61: operation parameter data
Aave: average value
Amin: minimum value
Sc: cycle component spectrum
Sp: pulsating component spectrum

The invention claimed is:

1. An internal combustion engine misfire detecting device for detecting a misfire of an internal combustion engine having a plurality of cylinders, the internal combustion engine misfire detecting device comprising:

a pulsating component acquisition unit for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;

a difference parameter acquisition unit for acquiring a difference parameter correlated with a degree of a difference in an operation of each of the plurality of cylinders; and an all-cylinder misfire determination unit for determining that an all-cylinder misfire has occurred in the internal combustion engine in a case where the pulsating component spectrum acquired by the pulsating component acquisition unit falls below a first threshold value and the difference parameter acquired by the difference parameter acquisition unit falls below a second threshold value, wherein the all-cylinder misfire determination unit determines the all-cylinder misfire without detecting a misfire for each of the plurality of cylinders to avoid an amount of non-combustion gas from increasing due to occurrence of the all-cylinder misfire.

2. The internal combustion engine misfire detecting device according to claim 1, wherein the difference parameter acquisition unit is configured to analyze a sensor value detected by each of a plurality of cylinder sensors for detecting an operation state of each of the plurality of cylinders and to acquire the difference parameter.

3. The internal combustion engine misfire detecting device according to claim 2, wherein the difference parameter acquisition unit is configured to analyze a temperature of an exhaust gas detected by each of the plurality of cylinder sensors.

4. The internal combustion engine misfire detecting device according to claim 2, wherein the difference parameter acquisition unit is configured to acquire, as the difference parameter, a value obtained by subtracting a minimum value of a plurality of the sensor values from an average value of the plurality of sensor values.

5. The internal combustion engine misfire detecting device according to claim 1, wherein the difference parameter acquisition unit is configured to frequency-analyze target data indicating a change over time in a sensor value detected by a single sensor that is a sensor value correlated with the degree of the difference and to acquire a cycle component spectrum that is a spectrum at a frequency for one cycle of the internal combustion engine as the difference parameter.

6. The internal combustion engine misfire detecting device according to claim 5,
wherein the difference parameter acquisition unit is configured to frequency-analyze the operation parameter data as the target data.

7. The internal combustion engine misfire detecting device according to claim 5,
wherein the operation parameter is a rotation speed of a turbine that is rotated by an exhaust gas exhausted from each of the plurality of cylinders or an inlet exhaust gas pressure of the turbine.

8. The internal combustion engine misfire detecting device according to claim 1, further comprising:
a partial misfire determination unit for determining that a partial misfire has occurred in the internal combustion engine in a case where the pulsating component spectrum acquired by the pulsating component acquisition unit falls below the first threshold value and the difference parameter acquired by the difference parameter acquisition unit is equal to or larger than a third threshold value that is a value which is greater than the second threshold value.

9. An internal combustion engine misfire detecting device for detecting a misfire of an internal combustion engine having a plurality of cylinders, the internal combustion engine misfire detecting device comprising:
a pulsating component acquisition unit for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;
a change rate parameter acquisition unit for acquiring a change rate parameter indicating a degree of a change in an operating parameter correlated with the overall operation status of the plurality of cylinders; and
an all-cylinder misfire determination unit for determining that an all-cylinder misfire has occurred in the internal combustion engine in a case where the pulsating component spectrum acquired by the pulsating component acquisition unit falls below a first threshold value and an absolute value of the change rate parameter acquired by the change rate parameter acquisition unit exceeds a fourth threshold value,
wherein the all-cylinder misfire determination unit determines the all-cylinder misfire without detecting a misfire for each of the plurality of cylinders to avoid an amount of non-combustion gas from increasing due to occurrence of the all-cylinder misfire.

10. The internal combustion engine misfire detecting device according to claim 9, further comprising:
a partial misfire determination unit for determining that a partial misfire has occurred in the internal combustion engine in a case where the pulsating component spectrum acquired by the pulsating component acquisition unit falls below the first threshold value and the absolute value of the change rate parameter acquired by the change rate parameter acquisition unit is equal to or smaller than a fifth threshold value that is a value which is smaller than the fourth threshold value.

11. The internal combustion engine misfire detecting device according to claim 9,
wherein the change rate parameter acquisition unit is configured to acquire the operation parameter as the operating parameter.

12. The internal combustion engine misfire detecting device according to claim 9,
wherein the operation parameter is a rotation speed of a turbine that is rotated by an exhaust gas exhausted from each of the plurality of cylinders or an inlet exhaust gas pressure of the turbine.

13. An internal combustion engine misfire detecting method for detecting a misfire of an internal combustion engine having a plurality of cylinders, the internal combustion engine misfire detecting method comprising:
a pulsating component acquisition step for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;
a difference parameter acquisition step for acquiring a difference parameter correlated with a degree of a difference in an operation of each of the plurality of cylinders; and
an all-cylinder misfire determination step for determining that an all-cylinder misfire has occurred in the internal combustion engine in a case where the pulsating component spectrum acquired through the pulsating component acquisition step falls below a first threshold value and the difference parameter acquired through the difference parameter acquisition step falls below a second threshold value,
wherein the all-cylinder misfire determination unit determines the all-cylinder misfire without detecting a misfire for each of the plurality of cylinders to avoid an amount of non-combustion gas from increasing due to occurrence of the all-cylinder misfire.

14. An internal combustion engine misfire detecting method for detecting a misfire of an internal combustion engine having a plurality of cylinders, the internal combustion engine misfire detecting method comprising:
a pulsating component acquisition step for frequency-analyzing operation parameter data indicating a change over time in an operation parameter correlated with an overall operation status of the plurality of cylinders and acquiring a pulsating component spectrum that is a spectrum at a frequency of pulsation of the internal combustion engine;
a change rate parameter acquisition step for acquiring a change rate parameter indicating a degree of a change in an operating parameter correlated with the overall operation status of the plurality of cylinders; and
an all-cylinder misfire determination step for determining that an all-cylinder misfire has occurred in the internal combustion engine in a case where the pulsating component spectrum acquired through the pulsating component acquisition step falls below a first threshold value and an absolute value of the change rate parameter acquired through the change rate parameter acquisition step exceeds a fourth threshold value,
wherein the all-cylinder misfire determination unit determines the all-cylinder misfire without detecting a misfire for each of the plurality of cylinders to avoid an amount of non-combustion gas from increasing due to occurrence of the all-cylinder misfire.

* * * * *